(12) United States Patent
Ghosh et al.

(10) Patent No.: US 8,539,500 B2
(45) Date of Patent: Sep. 17, 2013

(54) EFFICIENT PARTIAL EXECUTION FOR THE PARALLELIZATION OF SOFTWARE ANALYSIS IN A DISTRIBUTED COMPUTING ENVIRONMENT

(75) Inventors: Indradeep Ghosh, Cupertino, CA (US); Mukul Ranjan Prasad, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 232 days.

(21) Appl. No.: 12/957,390

(22) Filed: Nov. 30, 2010

(65) Prior Publication Data

US 2012/0110590 A1    May 3, 2012

Related U.S. Application Data

(60) Provisional application No. 61/408,167, filed on Oct. 29, 2010.

(51) Int. Cl.
*G06F 9/46* (2006.01)
*G06F 9/44* (2006.01)
*G06F 9/00* (2006.01)
*G06F 7/38* (2006.01)

(52) U.S. Cl.
USPC ........... 718/104; 718/105; 712/234; 712/239; 712/240

(58) Field of Classification Search
None
See application file for complete search history.

(56) References Cited

U.S. PATENT DOCUMENTS

| | | | |
|---|---|---|---|
| 2007/0244663 A1 | 10/2007 | Haemel et al. | 702/121 |
| 2008/0082969 A1 | 4/2008 | Agha et al. | 717/130 |
| 2008/0209436 A1 * | 8/2008 | Agha et al. | 718/106 |
| 2010/0125832 A1 | 5/2010 | Prasad et al. | 717/124 |
| 2010/0146514 A1 | 6/2010 | Alexander et al. | 718/104 |

OTHER PUBLICATIONS

U.S. Appl. No. 12/957,387; pp. 55, Nov. 30, 2010.
U.S. Appl. No. 12/957,391; pp. 53, Nov. 30, 2010.
U.S. Appl. No. 12/957,392; pp. 51, Nov. 30, 2010.
U.S. Appl. No. 12/957,393; pp. 49, Dec. 1, 2010.
Extended European Search Report; Application No. 11186779.2-2211; pp. 10, Mar. 5, 2012.
Andrew King; "Distributed Parallel Symbolic Execution"; Kansas State University; 2009; pp. 115.
Extended European Search Report; Application No. 11186393.2-2211; pp. 10, Mar. 5, 2012.
Extended European Search Report; Application No. 11186967.3-2211; pp. 10, Mar. 5, 2012.

(Continued)

*Primary Examiner* — Meng An
*Assistant Examiner* — Bradley Teets
(74) *Attorney, Agent, or Firm* — Baker Botts L.L.P.

(57) ABSTRACT

An electronic device includes a memory, a processor coupled to the memory, and one or more policies stored in the memory. The policies include a resource availability policy determining whether the processor should continue evaluating the software, and a job availability policy determining whether new jobs will be created for unexplored branches. The processor is configured to receive a job to be executed, evaluate the software, select a branch to explore and store an initialization sequence of one or more unexplored branches if a branch in the software is encountered, evaluate the job availability policy, decide whether to create a job for each of the unexplored branches based on the job availability policy, evaluate the resource availability policy, and decide whether to continue evaluating the software at the branch selected to explore based on the resource availability policy. The job indicates of a portion of software to be evaluated.

42 Claims, 8 Drawing Sheets

(56) References Cited

OTHER PUBLICATIONS

Extended European Search Report; Application No. 11186997.0-1225; pp. 6, Mar. 30, 2012.
Siddiqui et al.; "ParSym: Parallel Symbolic Execution"; 2nd International Conference on Software Technology and Engineering (ICSTE); IEEE; pp. V1405-V1409, Oct. 3-5, 2010.
Extended European Search Report; Application No. 11186371.8-2211; pp. 9, Mar. 4, 2012.

* cited by examiner

EFFICIENT PARTIAL EXECUTION FOR THE PARALLELIZATION OF SOFTWARE ANALYSIS IN A DISTRIBUTED COMPUTING ENVIRONMENT

RELATED APPLICATION

This application claims the benefit under 35 U.S.C. §119 (e) of U.S. Provisional Application Ser. No. 61/408,167 filed Oct. 29, 2010, entitled "METHOD AND SYSTEM FOR EFFICIENT PARALLELIZATION OF A SOFTWARE VERIFICATION PROBLEM THROUGH INTELLIGENT LOAD BALANCING".

TECHNICAL FIELD

The present invention generally relates to software verification and, more particularly, to efficient partial computation for the parallelization of software analysis in a distributed computing environment.

BACKGROUND

Conventional methods for software testing lack the ability to unearth hard, corner-case bugs. Formal methods for software verification offer the promise to unearth hard, corner-case bugs. Symbolic execution is a verification technique that can uncover erroneous behaviors. Parallelizing software verification such as symbolic execution across multiple computer entities requires load balancing to approach linear speeds.

SUMMARY

In one embodiment, an electronic device includes a memory, a processor coupled to the memory, and one or more policies stored in the memory. The one or more policies stored in the memory include a resource availability policy determining whether the processor should continue evaluating the software, and a job availability policy determining whether new jobs will be created for unexplored branches. The processor is configured to receive a job to be executed, evaluate the software, select a branch to explore and store an initialization sequence of one or more unexplored branches if a branch in the software is encountered, evaluate the job availability policy, decide whether to create a job for each of the unexplored branches based on the job availability policy, evaluate the resource availability policy, and decide whether to continue evaluating the software at the branch selected to explore based on the resource availability policy. The job includes an indication of a portion of software to be evaluated.

In another embodiment, a method for verifying software includes receiving a job to be executed, evaluating the software; selecting a branch to explore and storing an initialization sequence of one or more unexplored branches if a branch in the software is encountered, evaluating a job availability policy, deciding whether to create a job for each of the unexplored branches based on the job availability policy, evaluating a resource availability policy, and deciding whether to continue evaluating the software at the branch selected to explore based on the resource availability policy. The job includes an indication of a portion of software to be evaluated. The job availability policy determines whether new jobs will be created for unexplored branches. The resource availability policy determines whether the processor should continue evaluating the software.

In yet another embodiment, an article of manufacture includes a computer readable medium; and computer-executable instructions carried on the computer readable medium. The instructions are readable by a processor. The instructions, when read and executed, cause the processor to receive a job to be executed, evaluate the software; select a branch to explore and storing an initialization sequence of one or more unexplored branches if a branch in the software is encountered, evaluate a job availability policy, decide whether to create a job for each of the unexplored branches based on the job availability policy, evaluate a resource availability policy, and decide whether to continue evaluating the software at the branch selected to explore based on the resource availability policy. The job includes an indication of a portion of software to be evaluated. The job availability policy determines whether new jobs will be created for unexplored branches. The resource availability policy determines whether the processor should continue evaluating the software.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
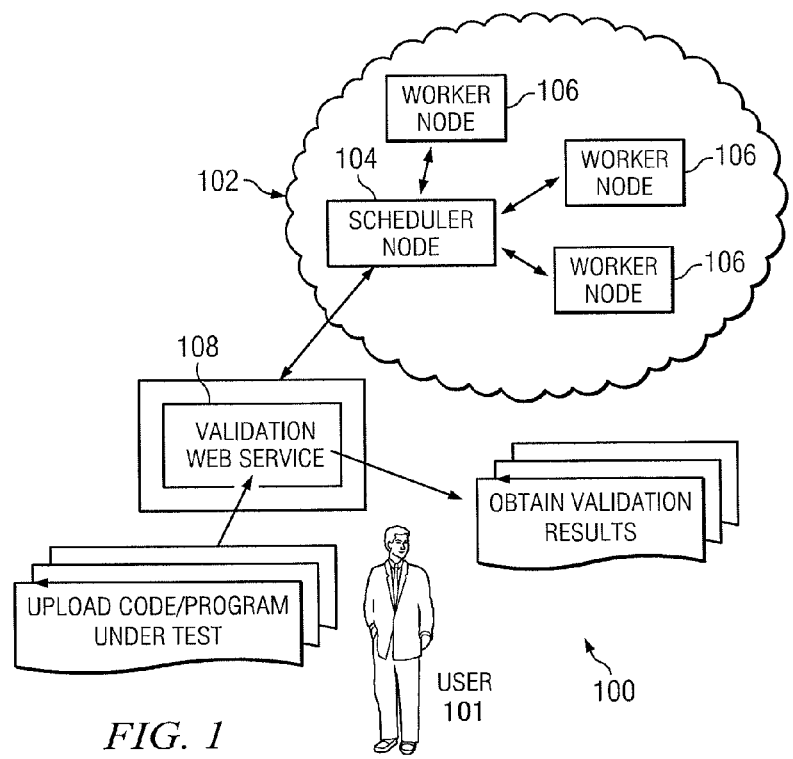
FIG. 1 is an example embodiment of a loosely coupled distributed computing system configured to provide efficient parallelization of software verification.

FIG. 1 is an example embodiment of a loosely coupled distributed computing system 100 configured to provide efficient parallelization of software verification. Such techniques may be provided by efficient load balancing between distributed computing resources.

The distributed computing system 100 may include any distributed computing environment including multiple, networked, and potentially computing resources. Such computing resources may be heterogeneous. In various embodiments, the connection topology of the computing resources may be unknown or irregular such that the software verification service being implemented in the distributed computing system 100 cannot take advantage of specific topologies in order to execute the computation task at hand.

In one embodiment, the distributed computing system 100 may be implemented in a cloud computing framework or environment. The distributed computing system 100 may be implemented by one or more computing nodes. One such computing node may be designated and implemented as a scheduler node 104, which may function as a main computing node. Other computing nodes may be designated and implemented as worker nodes 106. The computing nodes may be implemented in any suitable computing resource or electronic device, including but not limited to, a server, computer, or any aggregation thereof. The scheduler node 104 may be communicatively coupled to the worker nodes 106. The computing nodes may be communicatively coupled through a network 102. Network 102 may be implemented in any suitable network arrangement to communicatively couple the computing nodes, or in any suitable network, such as a wide area network, a local area network, an intranet, the Internet, or any combination of these elements.

The distributed computing system 100 may be configured to provide a service for efficient parallelization of a software verification problem by running a validation web service 108 from the scheduler node 104, or any other suitable server, node, or machine, or combination thereof. A user 101 of the validation web service 108 may be able to load or upload code, programs, or other software to be tested by the validation web service 108. Hereinafter, such code, programs, or other software to be tested may be referred to as "code under test." The user 101 of the validation web service 108 may be able to access the validation web service 108 to obtain validation results. The results may include the output of the operation of the validation web service 108 on the distributed computing system 100 as described hereinafter.

The computing nodes may be configured to share computational loads associated with a task to be accomplished in a parallel fashion. For example, the computing nodes may work in parallel to test the validity and operations of a software program, such as code under test. In such an example, the scheduler node 104 may be communicatively coupled to the code under test, and configured to organize the operation of worker nodes 106 to test the code under test.

Figure 2:
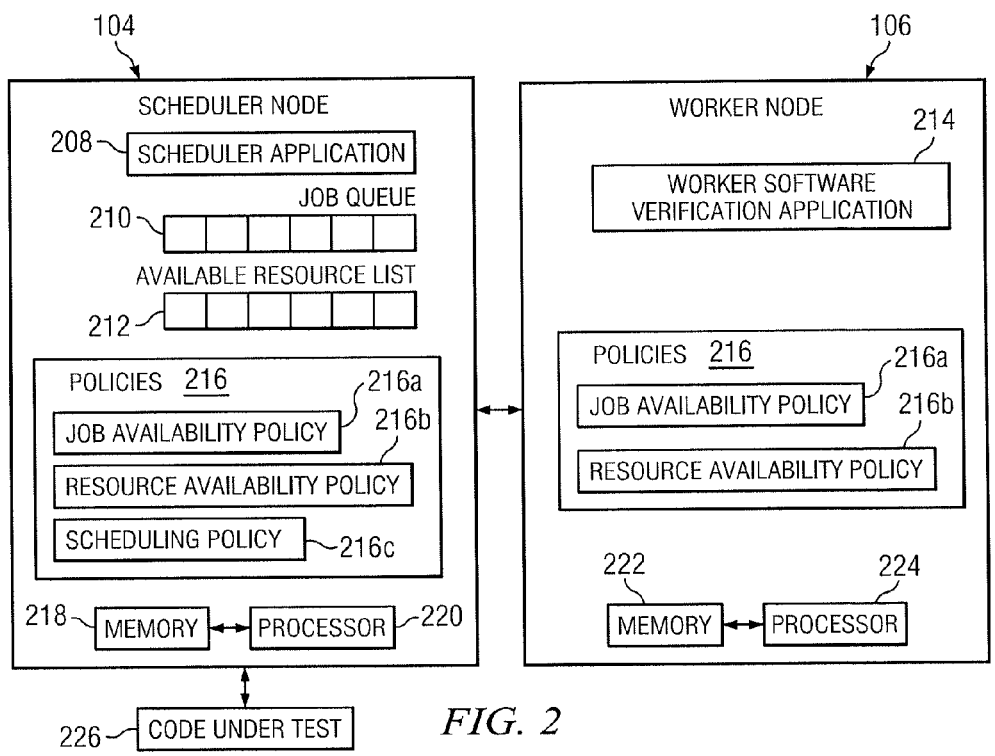
FIG. 2 is an example embodiment of computing nodes such as scheduler node and worker node.

FIG. 2 is an example embodiment of computing nodes such as scheduler node 104 and worker node 106. A scheduler node 104 may be communicatively coupled to a worker node 106, to dynamically test the code under test 226. More worker nodes 106 may be coupled to the scheduler node 104, but are not shown. Worker node 106 may be configured to verify software such as code under test 226 in parallel with other worker nodes, under direction from scheduler node 104.

Scheduler node 104 may include a processor 220 coupled to a memory 218. Scheduler node 104 may include a scheduler application 208. Scheduler application 208 may be configured to be executed by processor 220 and reside in memory 218. Scheduler application 208 may be configured to implement the operation of scheduler node 104 as described herein. Scheduler node 104 may include a job queue 210. Job queue 210 may be configured to contain a listing of one or more jobs, representing portions of code under test 226 to be verified. Job queue 210 may be implemented in a queue or any other suitable data structure. Job queue 210 may reside in memory 218. Scheduler node 104 may include an available resource list 212. Available resource list 212 may be configured to contain a listing of one or more computational resources, such as worker node 106, that are available to verify a portion of code under test 226. Available resource list 212 may be implemented in a list, queue, or any other suitable data structure. Available resource list 212 may reside in memory 218.

Worker node 106 may include a processor 224 coupled to a memory 222. The processors 220, 224 of the nodes may comprise, for example, a microprocessor, microcontroller, digital signal processor (DSP), application specific integrated circuit (ASIC), or any other digital or analog circuitry configured to interpret and/or execute program instructions and/or process data. The processors 220, 224 may interpret and/or execute program instructions and/or process data stored in the respective memories 218, 222 of the nodes. The memories 218, 222 may comprise any system, device, or apparatus configured to retain program instructions and/or data for a period of time (e.g., computer-readable media).

Worker node 106 may include a worker software verification application 214. Worker software verification application 214 may be configured to be executed by processor 224 and reside in memory 222. Worker node 106 may include one or more policies 216 which may be used by worker node to make decisions in its verification of portions of code under test 226. Worker node 106 may receive one or more of the policies 216 from scheduler node 104. Policies 216 may include, but are not limited to, a job availability policy, a resource availability policy, and a scheduling policy.

Scheduler application 208 and worker software verification application 214 may together make up middleware to enable the parallelization of computing tasks such as verifying code under test 226. Communication between worker node 106 and scheduler node 104 may be very expensive in terms of time, network and/or processing resources. The distributed computing system 100 may thus minimize communication between worker node 106 and scheduler node 104. Accordingly, the tasks of verifying code under test 226 may be divided between scheduler node 104 and worker nodes 106 through the operation of scheduler application 208 and worker software verification application 214. Scheduler application 208 may be configured to divide the work for verifying code under test 226 into tasks, provide the tasks to worker nodes 106 for parallel verification, provide policies and other parameters of operation to worker nodes 106 and other worker nodes, and harvest the results of such parallel verification. Worker software verification application 214 may be configured to test portions of code under test 226 as assigned by scheduler node 104 under policies 216 or other parameters provided by scheduler node 104 and report its results.

The processors 220, 224 of the nodes may comprise, for example, a microprocessor, microcontroller, digital signal processor (DSP), application specific integrated circuit (ASIC), or any other digital or analog circuitry configured to interpret and/or execute program instructions and/or process data. The processors 220, 224 may interpret and/or execute program instructions and/or process data stored in the respective memories 218, 222 of the nodes. The memories 218, 222 may comprise any system, device, or apparatus configured to hold and/or house one or more memory modules. Each memory module may include any system, device or apparatus configured to retain program instructions and/or data for a period of time (e.g., computer-readable media).

Returning to FIG. 1, the distributed computing system 100 may be configured to provide software validation 108 as a service on the distributed computing system 100. The validation of software may be more efficiently accomplished by leveraging the parallel computing power of the distributed computing system 100. In one embodiment, the distributed computing system 100 may validate software such as code under test 226 by using symbolic execution. Symbolic execution may be accomplished in any suitable manner to validate the operation of software by use of symbols in execution. One example how such symbolic execution may be accomplished may be found in a copy of the application "Using Symbolic Execution to Check Global Temporal Requirements in an Application," U.S. application Ser. No. 12/271,651, which is incorporated herein by reference. Symbolic execution may be used to formalize portions of software behavior in order to check requirements. For example, the operation of a given portion of code under test may be represented by symbols and defined by a property. The possible outcomes of the code may be determined, and such a property may indicate the range of possible acceptable values. Symbolic execution may be used to determine whether any conditions exist which would invalidate such a property. For example, consider the software code:

```
foo(a, b, c) {
    int a,b,c;
    c = a + b;
    if (c > 0){
        c++; }
    return c;
}
```

For such code, symbols may be used to represent various elements of the code. For example, $a=x$, $b=y$, $c=z$, and $\Phi$ is equal to the resulting set, including values and conditions. The set $\Phi$ may be thus evaluated as, initially, $\Phi=\{z=x+y\}$, because of the instruction in the code requiring that $c=a+b$. Then, a conditional (if $c>0$) appears in the code, requiring a splitting of possibilities. From such a conditional, two possibilities exist, depending upon whether z is greater than zero, or not. Thus, the set $\Phi$ may be defined as either $\Phi=\{(z=x+y)\ \&\ (z>0)\}$ or $\Phi=\{(z=x+y)\ \&\ (z\leqq 0)\}$. The first of two such options may trigger the additional code requiring that z is incremented, resulting in $\Phi=\{(z=x+y+1)\ \&\ (z>0)\}$. Thus, $\Phi=\{(z=x+y+1)\ \&\ (z>0)\}$ and $\Phi=\{(z=x+y)\ \&\ (z\leqq 0)\}$ are the resulting symbolic paths computed through symbolic execution on the above software code fragment.

For such code, a property may be established requiring that if $a>1$ and $b>0$, then c must be greater than two. Such a property may be checked against the expressions to be evaluated by negating the property and determining whether any solutions for the negated property exist in such symbolic expressions. For example, for $\Phi=\{(z=x+y)\ \&\ (z\leqq 0)\}$, x is greater than one (as defined by the property), y is greater than zero (as defined by the property), z is equal to x+y (as required by the expression), z must be less than or equal to zero (as defined by the expression), and z must be less than or equal to two (as defined by negating the property). Solving these equations using a suitable constraint solver or decision procedure, a worker node 106 on the distributed computing system 100 may be configured to determine that no solution exists, and thus the code segment passes the criteria established by the property. Likewise, for $\Phi=\{(z=x+y+1)\ \&\ (z>0)\}$, x is greater than one (as defined by the property), y is greater than zero (as defined by the property), z is equal to x+y+1 (as required by the expression), z must be greater than zero (as required by the expression), and z must be less than or equal to two (as defined by negating the property). Solving these equations using a suitable constraint solver or decision procedure, a worker node 106 in the distributed computing system 100 may be configured to determine that no solution exists, and thus the code segment passes the criteria established by the property. If such a solution existed, thus violating the property, such a violation may be identified as a bug. Such a bug may be reported by the distributed computing system to the scheduler node 104, logged, or eventually reported to a user. The context in which the bug was determined, such as the code, property, and point in a tree, may be reported.

Thus, the distributed computing system may be configured to symbolically execute code under test to validate the software that is implemented by the code. By performing symbolic execution of the code under test, the distributed computing system may be configured to perform automatic testing. During its automatic testing, the distributed computing system may be configured at each conditional operation of code under test to divide the range of possibilities representing the possible sets of data to be used at a conditional branch in code under test into separate branches of a symbolic execution tree to be processed. In one embodiment, such branching, separating, and symbolic execution may be conducted recursively.

Figure 3:
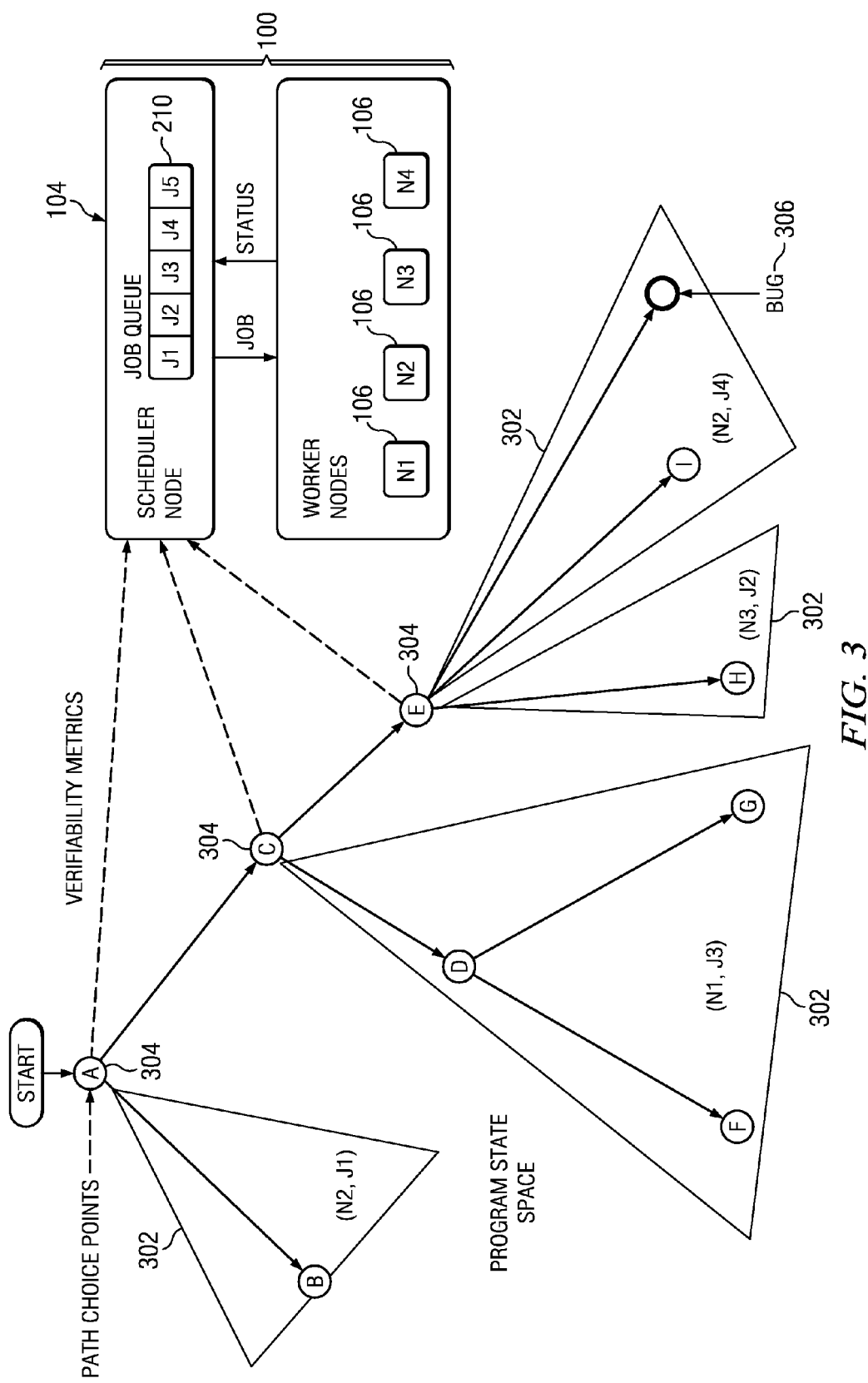
FIG. 3 illustrates the operation of the distributed computing system for validating software such as code under test as conditionals are encountered, expressions evaluated, new jobs created, and bugs determined.

FIG. 3 illustrates the operation of the distributed computing system 100 for validating software such as code under test 226 as conditionals are encountered, expressions evaluated, new jobs created, and bugs determined. Scheduler node 104 may be configured to assign jobs to worker nodes 106, which may begin with the START node 300. Worker nodes 106 may be configured to symbolically execute code until a conditional in the code is reached. Symbolic execution of code under test 226 at a conditional may require the symbolic execution of the code associated with the different execution options subsequent to the conditional. For instance, from the example above, the conditional associated with "if (c>0)" may yield two portions of code that will be symbolically executed. In some cases, such divisions may contain large sections of code that will in turn contain additional conditionals. Such divisions may be represented in a subtree 302. Conditionals that are encountered within the software to be symbolically executed and tested may be represented by path choice points 304. Path choice points 304 may represent the operation of a conditional, for which multiple subsequent paths are possible. Using the previous example, a node at a path choice point 304 may generate at least two possible ranges of z, for which each range will be symbolically executed: z greater than one, and z less than or equal to zero. Each such decision point 304 may in turn generate additional conditional decisions that must be made. Thus, the graph as shown in FIG. 3 may represent the growth of the required symbolic execution of a portion of the code under test. Each new subtree 302 created by the growth of symbolic execution, which will require additional symbolic execution, may be defined by worker node 106 as a job for scheduler node 104 to subsequently assign to the same or another worker node 106. Consequently, each job may represent a subtree 302 of the graph of code to be symbolically executed.

In the example of FIG. 3, four conditionals have been symbolically executed and have generated four subtrees 302 that have been assigned as jobs J1, J2, J3 and J4. The scheduler node 104 may be configured to assign jobs to one or more worker nodes 106, identified as N1, N2, N3 and N4. The worker nodes 106 may be configured to define new jobs from branches of path choice points 304 as they are encountered during the symbolic execution of code under test. The worker nodes 106 may also be configured to instead finish execution of branches of path choice points 304 as they are encountered during the symbolic execution of code under test. For example, during execution of job J3 worker node N1 encountered path choice point D, but continued symbolic execution of both the resulting branches. In contrast, a worker node 106 encountered the conditional associated with path choice point E, created at least one new job associated with one of the branches of execution, and presently the branches of the conditional are included in jobs J2 and J4, being symbolically executed by worker nodes N3 and N2. The policies by which new jobs are created, split, and assigned are discussed below. As the distributed computing system 100 may include any number of worker nodes 106, so too any number of worker nodes 106 may be available for assignment of jobs by scheduler node 104. Scheduler node 104 may be configured to store jobs as they are created from worker nodes 106 in the job queue 210.

The worker nodes 106 may be configured to symbolically execute the jobs that they are assigned by the scheduler node 104. The worker nodes 106 may reach additional conditionals in the code that they are symbolically executing. Depending upon policies described below, the worker nodes 106 may continue processing the branches of the conditional, or designate the branches of the conditional as new jobs, and return the new jobs to the scheduler node 104, which will be assigned to one of the worker nodes 106 by scheduler node 104 according to criteria described below. Worker nodes 106 may terminate symbolic execution of a job depending upon policies as described below. Worker nodes 106 symbolically executing a portion of code in a subtree 302 may reach a result, which may include verifying the validity of the code in the subtree 302 according to the properties determined by symbolic execution; finding a bug 306 as a violation of a property determined by symbolic execution; or reaching some bound of computation in terms of time, depth, or another parameter. The worker node 106 may be configured to convey its status and results of symbolic execution to the scheduler node 104 upon termination of the job.

The scheduler node 104 may be configured to balance the execution of jobs. The work required to execute any of the created jobs may be significantly different compared to other jobs. For example, although the subtree 302 of job J3 contains several elements to be evaluated, such elements may be simpler in scope than the elements of the subtree 302 of job J2. Nevertheless, in one implementation scheduler node 104 may be configured to allow exploration of a tree of code to be symbolically executed to a depth Y until under a certain number X of traces of code are generated to be symbolically executed, where X worker nodes 106 are available. Thus, traces of depth (Y−1) may be sent to a number of worker nodes 106, wherein the number of worker nodes 106 is less than or equal to X. As each worker node 106 finishes its assigned job, its output data is provided to the scheduler node 104 which aggregates the output data after the last worker node 106 has finished. In another implementation, the scheduler node 104 may explore a tree of code to be symbolically executed to depth Y until at least X traces are generated, where X worker nodes 106 are available to symbolically execute portions of code. The scheduler node 104 may be then configured to poll the worker nodes in a round robin basis to determine whether a worker node 106 has finished a job. If a given worker node 106 has finished, scheduler node 104 may be configured to collect the output of the job and send a new job from the job queue 210 to the worker node 106 that had just finished. However, such implementations may not account for some jobs being larger than other jobs, or that some worker nodes 106 may be idle while other worker nodes 106 are working on large jobs. Such implementations may also not be configured to split a job dynamically and assign such split jobs to idle workers.

Figure 4:
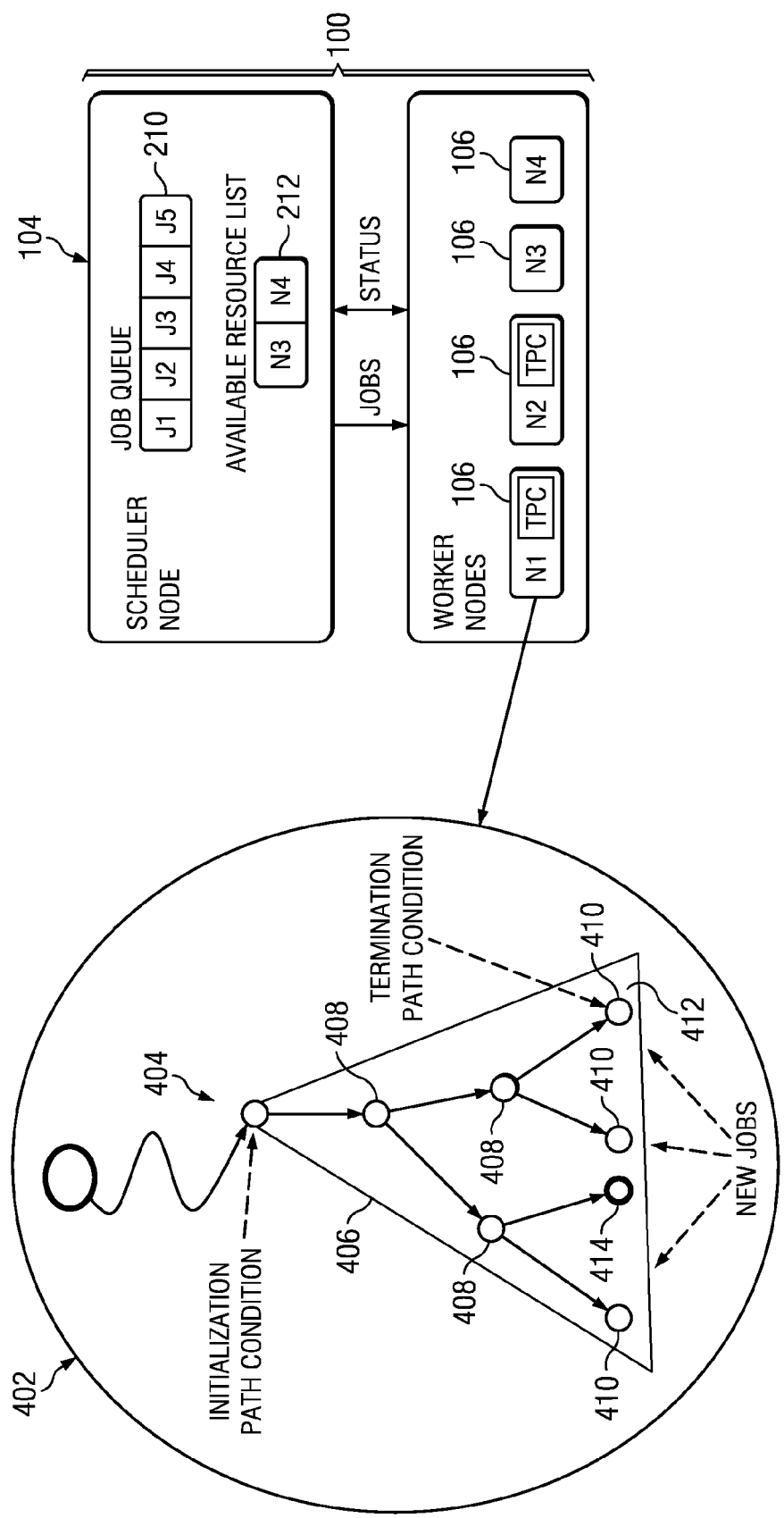
FIG. 4 illustrates operation of the distributed computing system configured to intelligently and dynamically partition code to be symbolically executed.

In operation, in one embodiment the scheduler node 104 may be configured to intelligently and dynamically balance jobs as they are created and as they are symbolically executed. FIG. 4 illustrates operation of the distributed computing system 100 configured to intelligently and dynamically partition code to be symbolically executed. Graph 402 may illustrate the execution tree of code under test as code is symbolically executed, new jobs are created, termination conditions are reached, and bugs are discovered by worker nodes 106 under direction of scheduler node 104. Scheduler node 104 may assign a job to a worker node 106, using policies and methods described below. Graph 402 may represent the execution of symbolic code of the job by worker node 106. An initial execution point 404, at which worker node is to begin symbolic execution of the job, may correspond to an initialization path condition. The initialization path condition may include a series of decisions or values of conditionals which led to the initial execution point 404. The initialization path condition may be set by the scheduler node 104 when the job is assigned to the worker node 106. A worker node 106 may be initialized through a replay of the decisions recorded in the initialization path condition. An initialization path condition may be a record of conditional decisions further up the tree of execution in the code under test which led to the initial execution point 404.

The worker node 106 may symbolically execute code until one of several conditions is reached. First, worker node 106 may symbolically execute a branch of the tree until that branch is verified, wherein the symbolic execution completes for that branch without detecting any bugs or errors. Such a condition may be represented by a verified point 414. A verified point 414 may represent a trace of program behavior that has been verified. Second, worker node 106 may symbolically execute a branch of the tree at a conditional, which may be processed into one or more subtrees. Each subtree may then in turn be symbolically executed or marked as a new job for symbolic execution at a later time. Such a point may be represented by an executed point 408. Third, as mentioned above, worker node 106 may symbolically execute a branch of the tree until one or more new jobs are created as a result of the symbolic execution. The designation of such a portion of the subtree as a new job, to be returned to the scheduler node for assignment, may be made by the worker node 106 according to the policies and methods described below. Such a condition may be represented by a new job 410. Fourth, a portion of the graph may be symbolically executed and determined to include a bug, inconsistency, or other error as determined by the symbolic execution. Such a bug may be returned to scheduler node 104. The bug may be represented as bug 414 on the graph 402.

Upon termination of a job, worker node 106 may be configured to store a termination path condition. The termination path condition may reflect the state in which the worker node 106 was executing when the job was terminated. The termination path condition may include a record of the predicate steps necessary to take to reach the state. The termination path condition may be used in determining whether the worker node 106 will be a good fit for a given job in the future.

Referring again to FIGS. 1 and 2, distributed computing system 100 may be configured to use one or more policies to make intelligent decisions to intelligently and dynamically balance the loads of processing jobs among worker nodes to efficiently analyze the code. Scheduler node 104 may be configured to assign such policies with assigned jobs to worker nodes 106, or to implement the policies in the actions of scheduler node 104. The worker nodes 106 may be configured to execute the policies without additional communication with the scheduler node 104.

In one embodiment, the distributed computing system 100 may be configured to use a job availability policy 216a to determine when a worker node 106, while symbolically executing a subtree of the code, should produce such new job for future processing, as opposed to the worker node 106 continuing to symbolically execute the subtree within the present job. In another embodiment, the distributed computing system 100 may be configured to use a resource availability policy 216b to determine when a given worker node 106, symbolically executing a job, should finish the symbolic execution of the job and become available for assignment of a new job, rather than continuing to symbolically execute the job. In yet another embodiment, the distributed computing system 100 may be configured to use a scheduling policy 216c to determine which jobs in the job queue 104 should be assigned, by scheduler node 104, to which worker nodes 106 designated in the available resource list 212.

As mentioned above, scheduler node 104 may be configured to coordinate the operation of distributed computing system 100 to efficiently parallelize the analysis of software through intelligent and dynamic load balancing. Scheduler node 104 may initialize the symbolic execution of the code under test, assign worker nodes 106 to jobs, monitor for the return of results and new jobs from worker nodes 106, reassign worker nodes 106 to additional jobs from the job queue 210, coordinate execution and termination of worker nodes 106, and determine when the symbolic execution of the code under test is complete. Scheduler node 104 may be configured to communicate with worker nodes 106 to exchange results, newly identified jobs, statuses, and parameters. In one embodiment, scheduler node 104 may be configured to update parameters for worker nodes 106 while worker nodes 106 are symbolically executing code. Such updates may be based upon statuses received from the worker nodes 106 containing execution statistics, wherein a worker node 106 informs scheduler node 104 that execution of jobs is taking longer or shorter than expected, a certain number of new jobs have been generated or generated at a certain rate, execution has been occurring for a certain length of time, or any other suitable information. Scheduler node 104 may be configured to adjust job availability parameters or resource availability parameters for an individual worker node 106 based on the information received from that worker node. Scheduler node 104 may be configured to adjust job availability or resource availability parameters for a range of worker nodes 106 based upon aggregate status reports from worker nodes 106, or upon the statuses of job queue 210 or available resource list 212.

Figure 5:
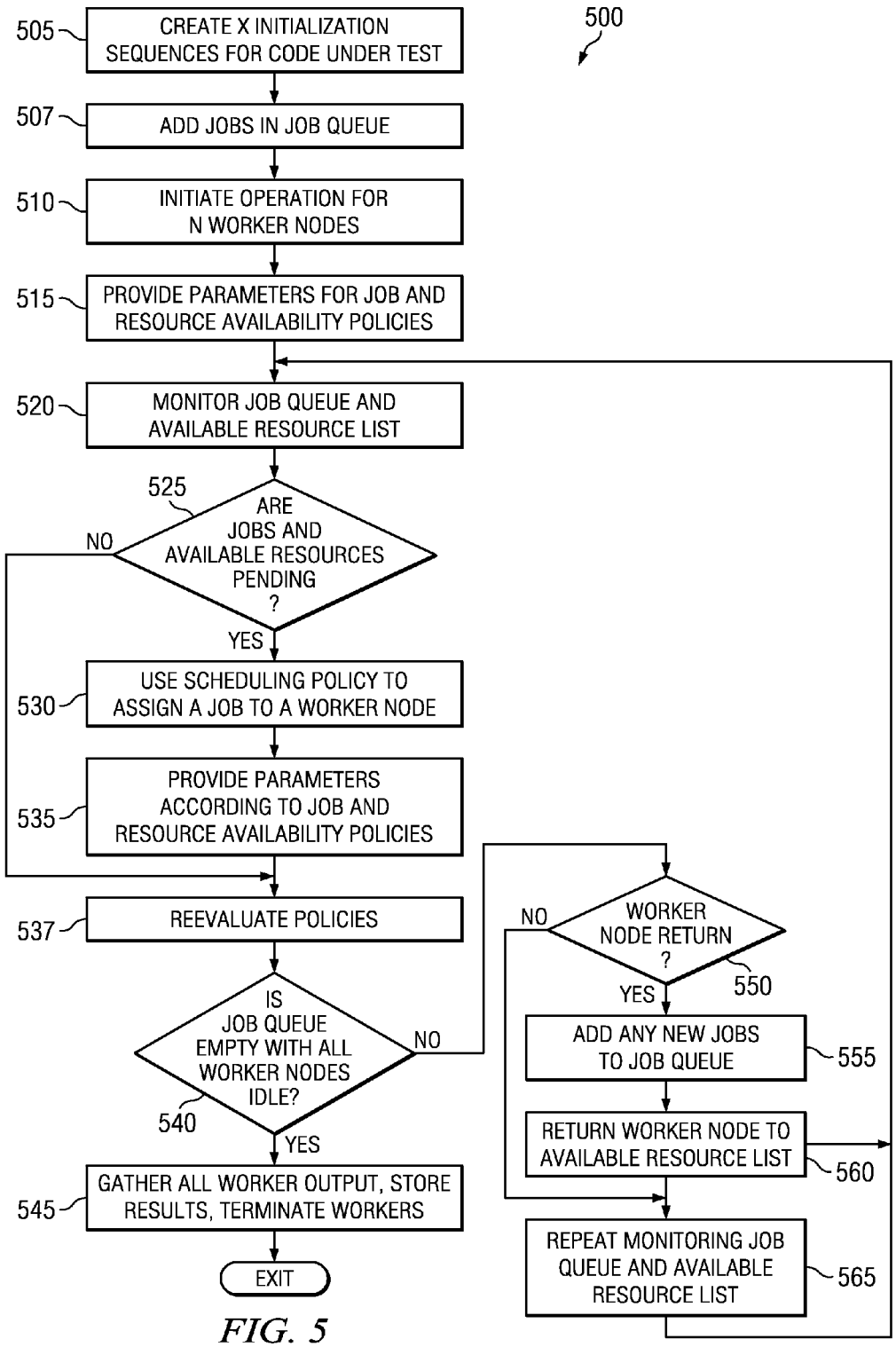
FIG. 5 is an example embodiment of a method for coordinating the operation of a distributed computing system to efficiently parallelize the analysis of software through intelligent and dynamic load balancing.

FIG. 5 is an example embodiment of a method 500 for coordinating the operation of a distributed computing system to efficiently parallelize the analysis of software through intelligent and dynamic load balancing. In one embodiment, method 500 may be implemented by scheduler node 104. In other embodiments, method 500 may be implemented in part by worker nodes 106.

In step 505, an initial symbolic execution phase may be accomplished. Any suitable initialization may be used. In one embodiment, X initialization sequences for the code under test may be discovered and created. The initialization sequences may reflect different initial execution points in an execution tree for the code under test. Some symbolic execution may be conducted to sufficiently create X different initial execution points, each for a different worker node. The number of X initial execution points should be greater than the number of available worker nodes. The available resource list may be consulted to determine the number of available worker nodes. In step 507, jobs for each initialization sequence may be added to the job queue.

In step 510, operation for N worker nodes may be initiated. Any suitable method for initiating the operation of N worker nodes may be used. In one embodiment, the scheduling policy may be consulted to assign pending jobs from the job queue to worker nodes. In another embodiment, the number of worker nodes (N) may be less than the number of pending jobs (X). For each worker node, in step 515 input parameters may be provided to the worker nodes. Such input parameters may be derived from policies such as a job availability policy or resource availability policy. Such policies may provide the worker node information about under what conditions new jobs should be created and when symbolic execution should be terminated.

In step 520, the job queue and available resource list may be monitored. In step 525, it may be determined whether both jobs and available resources are pending in the job queue and available resource list. If so, then in step 530 a job may be assigned to an available worker node. To do so, a scheduling policy may be used to determine which job should be assigned to which worker node. In step 535, input parameters may be provided to the worker node. Such input parameters may be derived from policies such as a job availability policy or resource availability policy. Such policies may provide the worker node information about under what conditions new jobs should be created and when symbolic execution should be terminated.

In step 537, if too many jobs, not enough jobs, too many resources, or not enough resources were pending, then the policies governing the creation of jobs or availability of resources may be reevaluated. If jobs are pending without available resources, then the policies may be examined and adjusted to better maximize the use of resources. For example, the job availability policy may be adjusted to create fewer new jobs during symbolic execution. The resource availability policy may be adjusted to terminate symbolic execution by a worker node sooner. Likewise, if available worker nodes are pending without jobs, then the policies may be examined and adjusted. For example, the job availability policy may be adjusted to create additional new jobs during symbolic execution. The resource availability policy may be adjusted to prolong symbolic execution by a worker node.

In step 540, it may be determined whether symbolic execution should be terminated. Such a determination may be made in any suitable way. In one embodiment, it may be determined whether the job queue is empty and all worker nodes are idle. If so, this condition may indicate that symbolic execution of the code under test has finished. If symbolic execution has finished, in step 545, all results from symbolic execution by the worker nodes may be gathered, the results stored and the worker nodes terminated.

In step 550, if symbolic execution of the code under test has not finished, then it may be determined whether any worker nodes have returned from executing their assigned jobs. Such a determination may be made in any suitable way. In one embodiment, a worker node finished with a job may provide a notification concerning the termination of the job. In step 555, any new jobs created during execution of the previous job by the worker node may be added to the job queue. In step 560, the worker node may be returned to the available resource list, if it is to continue verifying the software in the distributed computing system. Some worker nodes may no longer be available for symbolic execution as part of the distributed computing system, and thus may not be returned to the available resource list.

In step 565, if symbolic execution of the code under test has not finished, then the step of monitoring the job queue and available resource list for pending entries in Step 525 may be repeated, until symbolic execution of the code has finished.

Returning to FIG. 4, worker nodes 106 may be configured to be assigned a job by scheduler node 104. Worker nodes 106 may be configured to receive from the scheduler node 104 one or more operational parameters, on a persistent basis or in association with a newly assigned job. The operational parameters may be based upon one or more policies, which may be stored by the worker node. The worker node 106 may be configured to analyze the software associated with the job until termination conditions are reached. The worker node 106 may be configured to analyze the software in any suitable manner. In one embodiment, the worker node 106 may be configured to symbolically execute the software. The termination conditions may be based upon the resource availability policy. During analysis, the worker node 106 may be configured to create new jobs from discovered branches in the code under test discovered while analyzing the code. The conditions under which the worker node 106 may create a new job, as opposed to continuing to analyze the portion of the code under test, may be based upon the job availability policy. The worker node 106 may be configured to return the results of analyzing the code under test to the scheduler node, including new jobs. The worker node 106 may be configured to return to the available resource list 212 and await additional assigned jobs, or if the worker node will no longer be able to participate in the distributed network system 100 for analyzing software, not return to the available resource list 212.

Upon termination of the computation by a worker node 106, the worker node 106 may retain its last known state. Such a last known state may include the path in which it was symbolically executing when computation was terminated. Such a path may be known as the termination path condition. The termination path condition may be used as part of the scheduling policy for scheduling node 104 to assign a new job and a new node initialization to a newly finished worker node 106.

Figure 6:
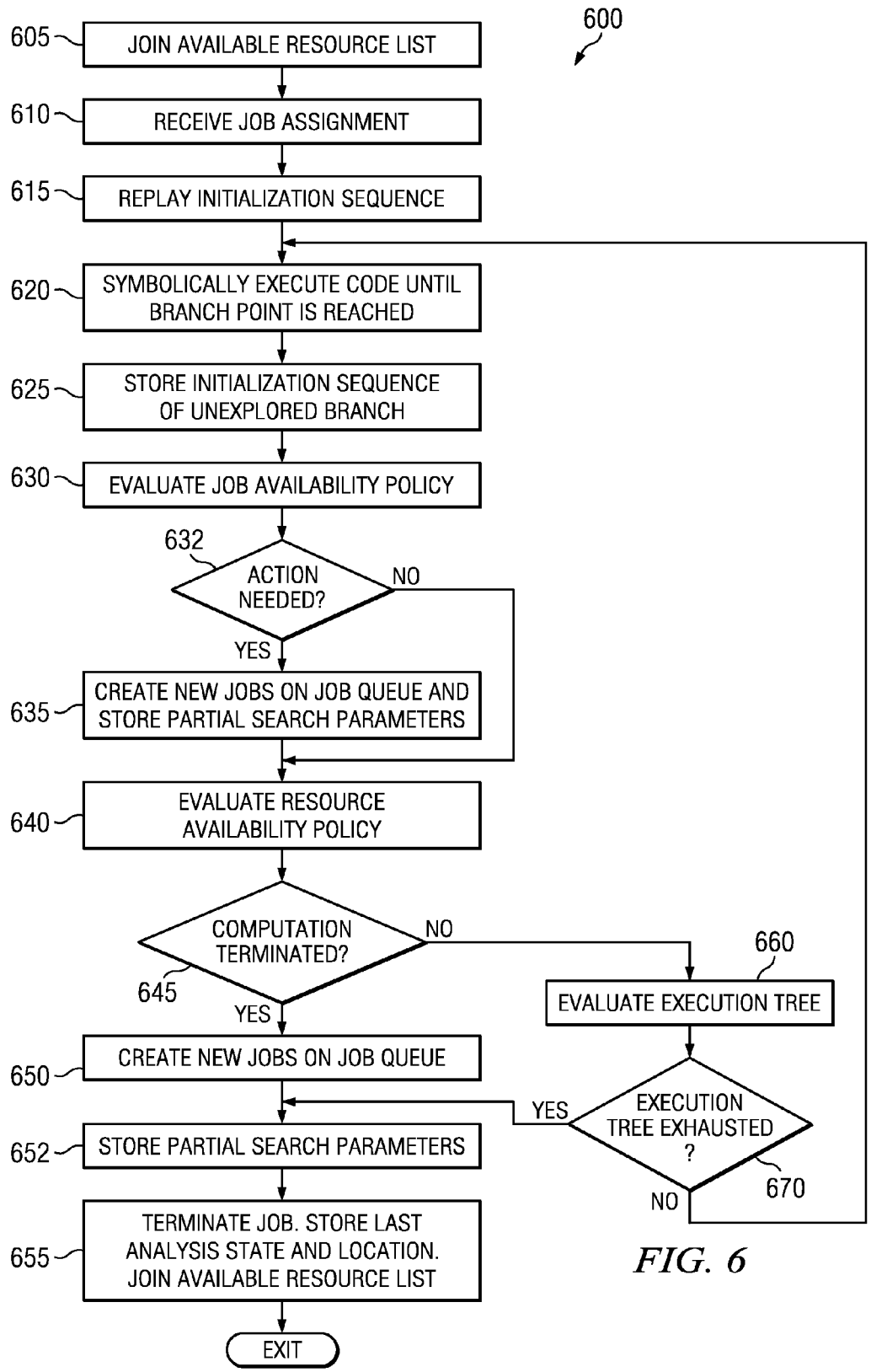
FIG. 6 is an example embodiment of a method for efficient partial computation for the parallelization of a software analysis problem in a distributed computing environment.

FIG. 6 is an example embodiment of a method 600 for efficient partial computation for the parallelization of a software analysis problem in a distributed computing environment. In one embodiment, method 600 may be implemented by one or more worker nodes 106. Method 600 may be conducted in parallel by any number of worker nodes 106. In another embodiment, method 600 may be implemented wholly or in part by a scheduler node 104. Method 600 may be initiated upon execution of steps 510 and 530 of FIG. 5.

In step 605, an available resource list may be joined. Joining such a list may provide direct or indirect notification to a scheduler node about the availability of a new resource for analyzing a portion of software. In step 610, a job corresponding to a portion of software to be analyzed may be received. At the same time, parameters regarding the operation of the analysis may be received. Such parameters may be provided as part of the assigned job. Such parameters may include an initialization path, initialization path condition, search strategy, job availability policy, resource availability policy, or any other suitable parameter for operation. In one embodiment, policies may be previously received.

In step 615, the initialization sequence may be replayed. Replaying the initialization sequence may comprise conducting a set of actions corresponding to the initialization path. The result of replaying the initialization sequence may be an arrival at a start node of analysis of code under test. In step 615, any suitable way of initializing analysis of code under test may be used. In one embodiment, an initial replay may be used to initialize for computation and analysis. In another embodiment, a partial backtrack-and-replay may be used to initialize for computation and analysis. Initialization replay may include starting at the beginning of a tree of execution and replaying each conditional decision that was made during the symbolic execution of code under test. Partial backtrack-and-replay may include determining a termination path condition of previous worker node, and undoing some decisions higher in the subtree associated with conditional branches in the code. Such a termination path condition may be provided as a parameter with the assigned job. One or more previous executions may be undone, and thus the execution path may be partially backtracked, to a previous higher point in the tree at which additional conditional decisions may be replayed.

In step 620, the code under test may be symbolically executed or otherwise analyzed. The code to be analyzed may initially correspond to the initialization path condition. During the operation of method 600, step 620 may be conducted for multiple portions of the execution tree of the code under test corresponding to the job. In one embodiment, step 620 may continue until a branch point in the code under test is reached. Such a branch point may include a conditional in the code under test, for which children execution trees will be generated and subsequently symbolically executed or otherwise analyzed.

The decision of which branch to execute and which to store may depend upon a chosen search strategy. Any suitable search strategy may be chosen. In one embodiment, a depth-first strategy may be used, wherein a deeper penetration of the execution tree may be preferred, so branches will be chosen which will lead to a deeper penetration. In another embodiment, a breadth-first strategy may be used, wherein a broader expansion of the execution tree may be preferred over a deeper penetration. In yet another embodiment, a best-first strategy may be used, wherein a branch is chosen by using some particular operational parameter. For example, types of branches may be preferred given importance, speed of execution, or other criteria.

If no branch point is reached, step 620 may continue until a leaf node in the execution tree is reached, wherein a subtree of the code under test may be fully analyzed. Such an analyzed subtree may lead to the conclusion, if an inconsistency or other error indicator is found, that the subtree contains a bug. In another case, if no such inconsistency or other indicator is found, it may be concluded that the subtree has been verified.

In step 625, a branch point may be reached. In one embodiment, one branch may be explored with further symbolic execution, and other branches stored as unexplored branches. In another embodiment, all branches may be stored as unexplored branches. To store the unexplored branch, the initialization sequence, or the steps that led to the branch, may be recorded.

In one embodiment, new jobs associated with unexplored branches may be created during symbolic execution of the code under test. In such a case, the method 600 may proceed to step 630 and subsequently to 640, wherein policies are evaluated to determine whether a new job needs to be created from the unexplored branch and whether a termination threshold has been reached. In another embodiment, new jobs associated with unexplored branches may be created only at the termination of symbolic execution. In such a case, the steps of creating new jobs from unexplored branches and populating them in a job queue may only happen in connection with step 650.

In step 630, the job availability policy may be evaluated to determine whether unexplored branches should be designated as new jobs for analysis, or should be retained for exploration within the current instance of method 600. The job availability policy may be evaluated for recently determined unexplored branches and for previously determined unexplored branches. Any suitable job availability policy may be used. The job availability policy may include a determination of how long the execution has been going on for the present job. The decision to create a new job may cause a split in the symbolic execution subtree wherein a branch associated with a conditional decision in the code under test may be separated and formed into a new job. Additional embodiments of the job availability policy are discussed below.

In step 632, if action is required by the job availability policy, for actions such as designating unexplored branches as new jobs for analysis, then in step 635 unexplored branches may be put on the job queue as new jobs. In one embodiment, actual placement of new jobs into the job queue may commence immediately. In such a case, new jobs may be transferred to a scheduler node. In another embodiment, actual placement of new jobs into the job queue may be delayed. Such a delay may include until a critical number of new jobs have been created, a set interval of time, upon request by the scheduler node, or upon premature termination of the present job according to resource availability policy. In addition, in step 635 partial search parameters, indicating the context of the searching strategy which yielded the new job, may be stored.

In step 640, the resource availability policy may be evaluated to determine whether analysis of the job should terminate, even though the job may not yet be fully analyzed. Any suitable resource availability policy may be used. Possible resource availability policies are discussed below. In step 645, if the computation and analysis of the job should terminate, then in step 650 new jobs may be created on the job queue for any remaining unexplored branches, and in step 652 partial search parameters stored. Step 650 may be implemented in a similar fashion to step 635. In step 655, the job may be terminated. The last analysis state and location may be stored. Such a state and location may serve as a future initialization point reference. The results of analysis, new jobs, and any other collected information may be provided to a scheduler node. The available resource list may be joined, indicating idleness and a request for an additional job.

If the computation and analysis of the job has not been determined to terminate by the job availability policy, then in step 660 the execution tree may be evaluated. The execution tree may be evaluated in any suitable way. In one embodiment, the execution tree may be evaluated according to the search strategies discussed above. If the execution tree is exhausted, then in step 670, the job may be completed and the method may proceed to step 652. If the execution tree is not exhausted, then the method may proceed to step 620 to continue symbolically executing code. The place in the execution tree at which step 620 will commence symbolic execution may be determined according to the search strategies discussed above.

During the execution of method 600, status updates regarding the length of execution, new jobs created, branches explored, search parameters used, or other information may be transmitted to a scheduler node.

During the execution of method 600, operational parameters may be received from a scheduler node. In one embodiment, such parameters may be received only once, for example, as described in step 610. In another embodiment, operational parameters may be received intermittently from a scheduler node. In such an embodiment, such parameters may be incorporated to modify the operation of method 600 accordingly.

Returning to FIG. 4, worker nodes 106 may be configured to provide dynamic and intelligent partial computation management for efficient parallelization of a software analysis problem on a distributed computing environment. Worker nodes 106 may be configured to accomplish such tasks by conducting analysis, symbolic execution, or computation that is intelligently and dynamically bounded. In one embodiment, worker nodes 106 may be configured to apply a threshold for bounded analysis based on factors in the context of the analysis. As indicated above, the analysis by a given worker node 106 may be controlled by parameters associated with, for example, the job availability policy and resource availability policy. Such parameters may be delivered by the scheduler node 104. Both job availability and resource availability may take into account various factors when being used to determine when a given worker node 106 should split a given job based on a conditional branch to create new jobs, and/or when to determine when a given worker node 106 has finished computing its job. Such factors may be evaluated in a bounding function.

In one embodiment, such factors may include, but are not limited to:

(1) the depth of the tree of execution that is currently taking place—$x$;

(2) the time spent on execution of a given subtree—$y$;

(3) the number of decision nodes explored in a given subtree—$z$;

(4) the number of free resources idling in available resource list—$w$;

(5) the history and/or statistics of computation on a global level, such as:

(a) average time on a path—$u$;

(b) average depth of completed paths—$v$.

A combination of these elements in a bounding function may be compared to a threshold. The worker node 106 may determine whether the threshold has been triggered by the result of a bounding function exceeding or otherwise meeting the threshold. In such a case a new job may be created, or in which case the worker node will have finished its computation. Such a threshold may be determined by any appropriate combination of the parameters described above. The threshold used may be different between job availability policy and resource availability policy. The threshold may be determined experimentally for each such policy, and for a particular type of code to be tested, or a particular code set to be tested. The threshold may be determined experimentally to balance new job creation and worker node computation. Each of the parameters described above may be assigned a corresponding constant or weighting value such as a, b, c, d, e or f. Thus, determination of whether such a threshold T has been exceeded may be formalized by the example formula for a bounding function:

$$a^*x + b^*y + c^*z + d^*w + e^*u + f^*v > T.$$

A bounding function may use any suitable calculation or determination for deciding whether the threshold has been exceeded using, for example, one or more of the above-described parameters. For example, a complex Boolean expression, binary function, non-linear function, or fuzzy calculation may be used as a bounding function. For example, if the number of waiting worker nodes exceeds ten, then the job availability threshold may be configured to be automatically exceeded, regardless of other factors. In another example, the job may simply be terminated, releasing all discovered new jobs. In yet another example, the weight value for the factor corresponding to waiting worker nodes may be increased. Such examples may be triggered by examining whether the job queue or available resource list exceed some maximum or fall below some minimum amount.

Such constants may be determined by experimentation similar to that experimentation described for the threshold T. Greater or lesser weight may be placed on given parameters, as their influence is determined in a particular situation. For example, scheduler node 104 may be configured to adjust the constants, and thus adjust the associated policy, based on status updates from worker node 106 or upon the availability of resources in available resource list 212 or new jobs in job queue 210. Scheduler node 104 may adjust such constants to optimize the usage of the worker nodes 210 in relation to the pending jobs in job queue 210. Similarly, scheduler node 104 may adjust the thresholds associated with either the resource availability resource policy or the job availability policy.

The threshold for job availability policy may be lower than the resource availability threshold. In such a case, jobs will be spawned while a worker has not been terminated. Otherwise, if the thresholds are equal, new jobs might be spawned only at the same time as the termination of the execution of the present job. In one example, a threshold function for creating new jobs may be determined to be $$-5*x+0.02*y+0.005*z+10*w-0.01*u-1*v>50$$

above which unexplored branches encountered by worker nodes 106 are to be created as new jobs. The values for the constants reflect only one example, and may be changed depending upon the specific circumstances encountered in particular software analysis. A discussion of the relative weight and polarity of each is given below for the example.

$-5*x$

"x" may be the depth of computation tree where execution is taking place. Depth may increase by one at each symbolic branch level. Thus, the constant "a" may likely be negative, as when the depth of the tree where computation is taking place increases, the prohibitive cost of replay means that it should become harder to reach the threshold and launch a new job.

$0.02*y$

"y" may be time in seconds that the worker node 106 is computing on the current job. The more time spent with such analysis may mean a higher propensity to terminate the analysis, and to spawn new jobs. Thus, constant "b" may typically be a positive value.

$0.005*z$

"z" may be the number of decision nodes already encountered in a subtree. If a decision subtree gets too large, the propensity to terminate the job and/or spawn new jobs may be increased. Thus, constant "c" may typically be positive. The value of "c" may be relatively low, as the sheer number of decision nodes already encountered in a subtree may not be as significant of a measure of the workloads that must be dynamically balanced.

$10*w$

"w" may be the number of idle worker nodes 106 in the available resource queue. Idle worker nodes may be a very bad problem to have, and as such, the constant "d" may be positive and large. A larger number span new jobs more aggressively, as well as terminate existing jobs sooner. In the context of a resource availability policy, wherein new jobs are not added to the job queue until the termination of the presently executing job, such a constant should be very high so as to release the new jobs for addition to the job queue. In such a situation, the number of pending new jobs discovered by the worker node 106 may also be taken into account in this factor.

$-0.01*u$

"u" may be the average time on a path in seconds. This may be the average time for paths within the present job, or the average time across all jobs as compiled by a scheduler node 104. This factor may be used to establish a minimum amount of time to complete some useful work, and to prevent frequent unproductive spawning of new jobs. As such, the constant "e" may be negative, and relatively small according to the speed of the distributed network system 100. This factor may be used to prevent excessive churning of resources, or excessive generation of small and insubstantial jobs, wherein performance degrades due to the overhead of assigning jobs to worker nodes 106 and communication between worker nodes 106 and scheduler node 104.

$-1*v$

"v" may be the average depth of the path of analysis and execution encountered thus far by the worker node 106. This may be the average for paths within the present job, or the average for all jobs as compiled by a scheduler node 104. This factor may be used to determine whether a certain depth has been reached, and if so, spawn new jobs. In some cases, this factor may be used to encourage deep levels of execution. Accordingly, the constant "f" may be positive or negative.

$>50$

As described above, the thresholds for job and resource availability may each be separately or together determined. The scheduler node 104 may adjust either threshold for worker nodes 106, depending upon the requirements to relatively optimization the usage of worker nodes 106. The thresholds for job and resource availability may be adjusted in relation to each other.

Figure 7:
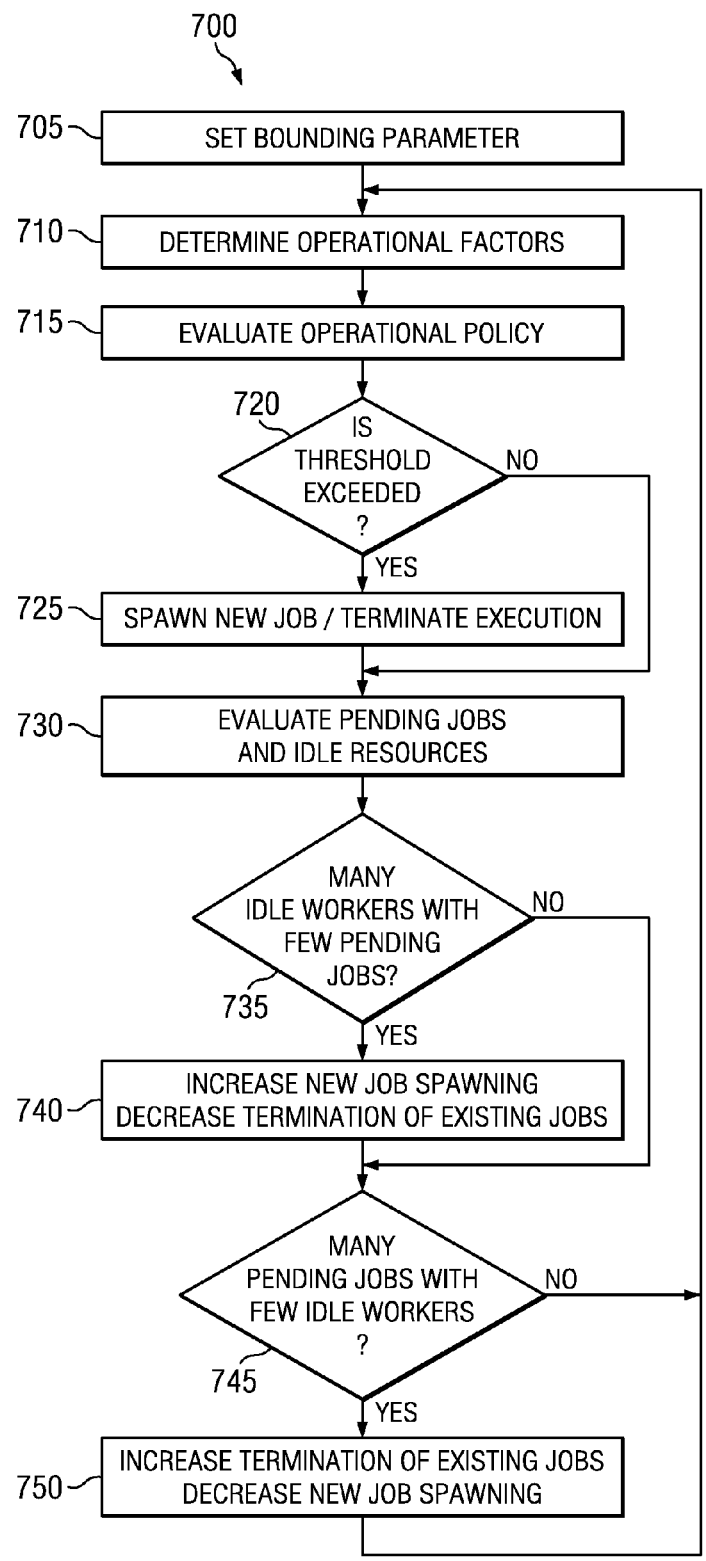
FIG. 7 is an example embodiment of a method for dynamic and intelligent partial computation management for efficient parallelization of a software analysis problem on a distributed computing environment.

FIG. 7 is an example embodiment of a method 700 for dynamic and intelligent partial computation management for efficient parallelization of a software analysis problem on a distributed computing environment. In one embodiment, method 700 may be implemented by one or more worker nodes 106 and/or scheduler node 104.

In step 705, a parameter for bounding the extent of analysis of software may be set. In one embodiment, such a parameter may be received from a scheduler node. In another embodiment, such a parameter may be sent to a worker node. The operational parameter may include any suitable operational parameter. In one embodiment, the parameter includes a threshold. In another embodiment, the parameter includes weighted values. The operational parameter may relate to any suitable aspect of the analysis of software. In one embodiment, the operational parameter may relate to a job availability policy. In another embodiment, the operational parameter may relate to resource availability policy. The parameter may have any suitable form. In one embodiment, the parameter may have the form $ax+by+cz+dw+eu+fv>T$.

In step 710, operational factors may be determined, wherein the factors are related to symbolic execution of the software. Such operational factors may include one or more of depth of tree where computation is taking place, time spent on computation in a subtree, number of decision nodes explored in a sub tree, number of free resources idling in a resource queue, average time spent on execution paths, and/or average depth of completed execution paths.

In step 715, an operational policy associated with the symbolic execution may be evaluated. Such an evaluation may be triggered upon, for example, discovery of an unexplored branch in code under test, termination of a job, or completion of a subtree. Step 715 may be implemented in, for example, steps 630 and 640 of FIG. 6. The operational policy may include, for example, a job availability policy or a resource availability policy.

In step 720, in association with step 715, it may be determined whether a threshold associated with the operational policy has been exceeded. Such a threshold may have been set according to the bounding parameter set in step 705 and judged according to the bounding parameter and the operational factors determined in step 710. If the threshold has been exceeded, in step 725 action may be taken. Such action may include terminating symbolic execution of the present the job or spawning a new job.

In step 730, the number of idle resources such as worker nodes, and the number of pending jobs to be executed may be evaluated. In step 735, if many worker nodes are idle while few or no jobs are pending, then in step 740 bounding parameters may be adjusted to increase the spawning of new jobs. Likewise, bounding parameters may be adjusted to decrease the termination of symbolic execution of existing jobs.

In step 745, if many jobs are pending while few or no worker nodes are idle, then in step 750 bounding parameters may be adjusted to increase the termination of symbolic execution of existing jobs. Likewise, bounding parameters may be adjusted to decrease the spawning of new jobs.

The method may be repeated at step 710 until the presently executing job has terminated.

Returning to FIG. 4, a worker node 106 may be configured to apply a node computation initialization technique for efficient parallelization of a software analysis problem in a distributed computing environment. Likewise, a scheduler node 104 may be configured to apply such a node computation initialization technique when evaluating a scheduling policy.

Once a worker node 106 is selected to be assigned a particular job, the worker node 106 may initialize its computation for symbolic execution. Such an initialization may include selecting between one or more initialization options for setting an initial state 404 for execution. Choosing a particular initialization option may speed up symbolic execution during initialization. Availability of different initialization options may also influence the scheduling policy of scheduler 104 as it considers the initialization requirements of various available worker nodes 106 for a particular job.

The notation describing node computation initialization may include denoting predicates. The code under test may contain any number of predicates on program variables. For example, a predicate may be (v1<5) OR (v2==TRUE), wherein v1 and v2 are variables in the code. Such a predicate may be denoted as P1, P2, etc. A path condition may include an ordered sequence of program predicates, or their negation, that is used to represent the state of the symbolic execution. For example, (P1, ¬ P2, P4, ¬ P7, P9) may represent a point in the tree of the symbolic execution of the program that may be reached by selecting these five predicates (or their negation) at their respective decision points.

An initialization path condition ("IPC") may be associated with a specific symbolic execution path, and may represent the path condition with which the job needs to be initialized. A worker node 106 would proceed with symbolic execution from the IPC. An example of an IPC may be the sequence of decisions made during symbolic execution to reach the initialization point 404. A termination path condition ("TPC") may be associated with a specific worker node 106 and represents the last path condition on which symbolic execution on the worker node 106 terminated. It may represent the final state of symbolic execution on the worker node 106 from the previous job that it processed. An example of a TPC may be termination path condition 412. A worker node 106 may be configured to store its TPC upon termination of a job. Scheduler node 104 may be configured to consider the TPC of worker nodes 106 when assigning jobs to worker nodes 106, as a part of calculation of initialization cost.

One such initialization option is a complete replay, wherein the worker node's computation is initialized by replaying all the decisions of conditionals associated with the job. Such an option may include the forward computation of the program along the symbolic path. Such an option may require extensive resources for replaying the previous decisions on conditionals within the code under test. Another option for initialization of a worker node computation may include backtrack-and-replay, wherein previous decisions associated with conditionals in a termination path condition may be undone. After the requisite number of previous decisions have been backtracked to reach a common set of predicates, the other predicate decisions may be replayed, until the node is initialized according to the job's initialization path condition. Starting with the TPC, predicates are backtracked one predicate at a time until the path condition is common with a prefix of the desired IPC. Then, the remaining steps of the IPC are replayed forward until the desired IPC is achieved.

Figure 8:
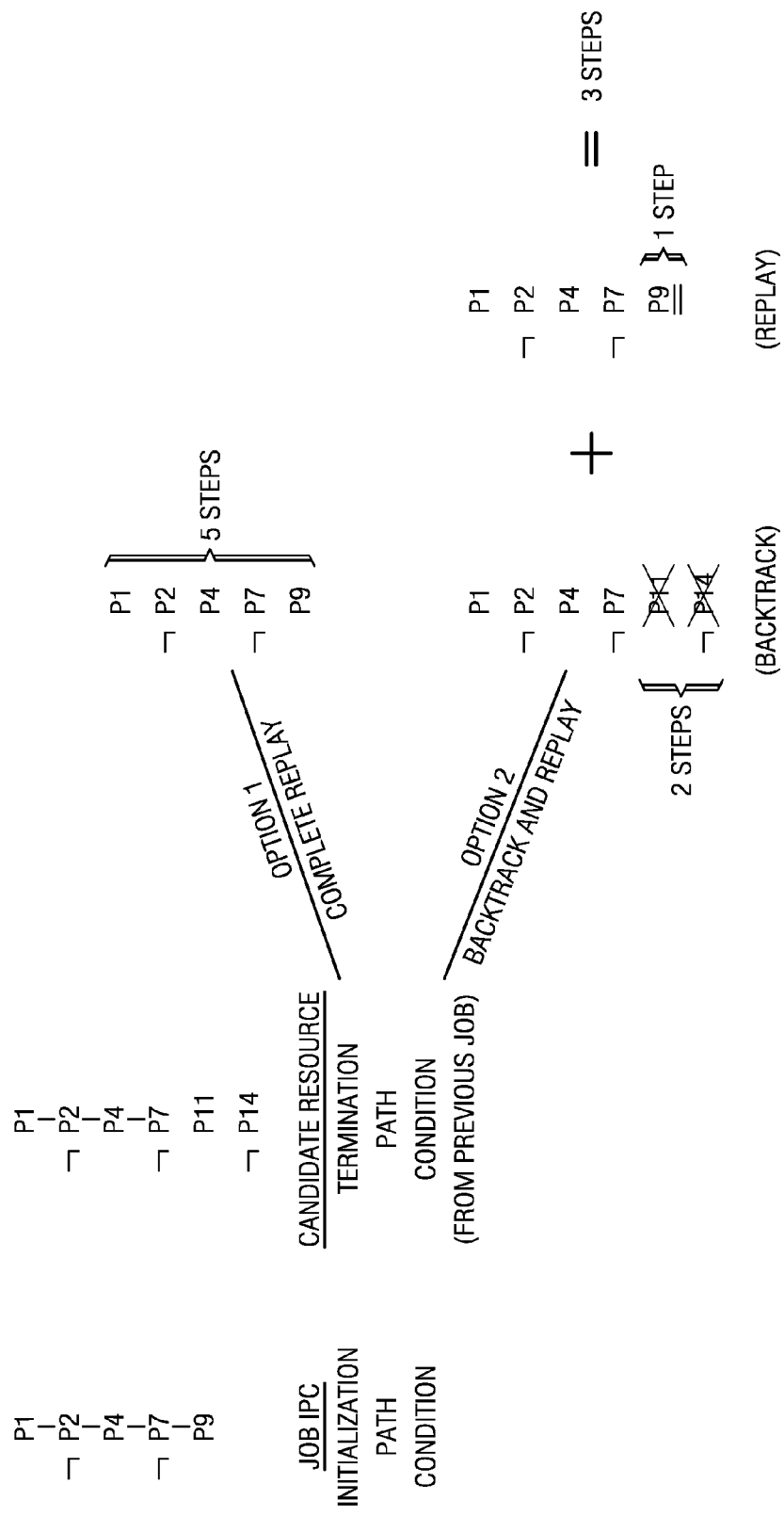
FIG. 8 shows the operation of the complete replay and backtrack-and-replay methods on an example initialization path condition and termination path condition.

FIG. 8 shows the operation of the complete replay and backtrack-and-replay methods on an example initialization path condition and termination path condition. For example, a particular job in the job queue 210 to be assigned to an available resource may have an initialization path condition of {P1, ¬ P2, P4, ¬ P7, P9}. Such a job may be evaluated for a worker node 106 in available resource list 212 whose termination path condition from executing a prior job may be {P1, ¬ P2, P4, ¬ P7, P11, ¬ P14}. Thus, the first four elements of the initialization path condition of the job and the termination path condition of the worker node 106 may be the same. Utilizing an initialization option of complete replay, the candidate worker node 106 may be required to replay the execution of all elements of the job's initialization path condition by making the predicate decisions of {P1, ¬ P2, P4, ¬ P7, P9}, taking five steps to do so. Utilizing the backtrack-and-replay option, the candidate worker node 106 may first backtrack the {¬ P14, P11} predicate operations, and then replay the P9 operation so as to match the pending job's initialization path condition, requiring a total of three steps. In this particular example, the backtrack-and-replay option may prove to be more efficient than complete replay method of initializing a worker node with the initialization path condition of the pending job. However, such a conclusion assumes that all steps may have an equal cost.

Returning to FIG. 4, worker node 106 or scheduler node 104 may be configured to quantify initialization cost by determining the number of backtracking steps, forwarding tracking steps, and combining them with costs determined by evaluating the symbolic execution of software on distributed computing system 100. Costs may be determined by scheduler node 104 or any other suitable entity. Costs may be a function of the specific symbolic execution engine used by distributed computing system 100 and the program under test. Costs may also vary from one step to another, as some predicates may be very complex.

The average forward computation cost ($c_f$) may be determined or found, which may represent the average cost of computing forward along a symbolic path to the next symbolic predicate. The average backtrack computation cost ($c_b$) may be determined or found, which may represent the average cost of backtracking (undoing) computation along the current symbolic path to the previous symbolic predicate. Such costs may be found by worker nodes 106 recording time requirements for backtracking and replaying steps, and the scheduler node 104 collecting such information from worker nodes 106 and averaging the information, or using the cost information stored in a worker node 106 for the actual predicates that must be backtracked or replayed. In one embodiment, the forward and backward computation costs may be set relative to each other.

Thus, the initialization cost of a complete replay option for a given job may be described as the number of steps in the IPC times the cost of a forward predicate step. The initialization cost of the backtrack-and-replay for a given worker node 106 may be described as the sum of the product of the number of backtrack predicate steps times the cost of a backtrack predicate step, plus the product of the number of forward predicate steps times the cost of a forward predicate step.

Scheduler node 104 may be configured to determine the initialization cost of a worker node 106 being assigned a job by determining the minimum between the cost of a complete replay of the IPC, and the cost of a backtrack-and-replay of the TPC of the worker node 106 to match the IPC. Thus, initialization cost may be a function of the job and the resource to which the job may be assigned.

Figure 9:
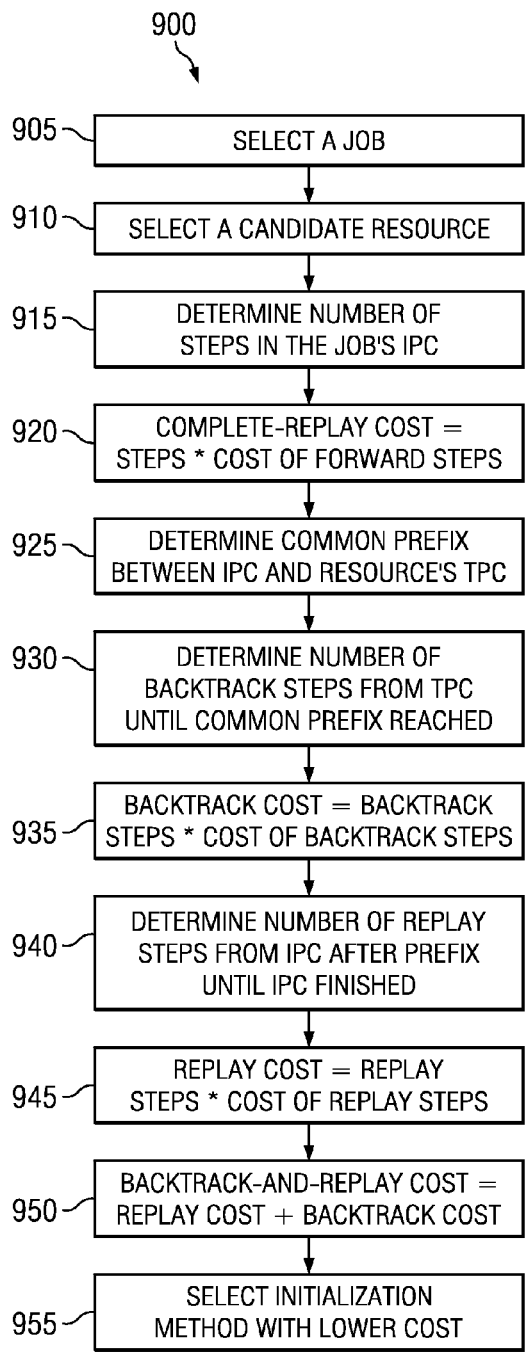
FIG. 9 is an example embodiment of a method for a node computation initialization technique for efficient parallelization of a software analysis problem in a distributed computing environment.

FIG. 9 is an example embodiment of a method 900 for a node computation initialization technique for efficient parallelization of a software analysis problem in a distributed computing environment. In one embodiment, method 900 may be implemented by scheduler node 104 or worker node 106.

In step 905, a job to be assigned to a resource may be selected. The job may have an IPC associated with it. Any suitable method for selecting a job may be used. In step 910, a candidate resource to assign the job to may be selected. Any suitable method for selecting a candidate resource may be used.

In step 915, the number of predicates in the job's IPC may be determined. In step 920, a cost for complete replay initialization may be made. The cost for complete replay initialization may be found by multiplying the number of steps in the IPC times the cost of a forward step. In one embodiment, the cost of a forward step may be determined globally. In another environment, the cost of a forward step may be determined by evaluating the time it took the forward step to be executed.

In step 925, a common prefix between the IPC and the TPC of the candidate resource may be determined. The common prefix may be the longest sequence of predicate elements in common between the IPC and TPC, beginning with the first predicate element.

In step 930, the number of predicate steps of the TPC to be backtracked, until the common prefix is reached, may be determined. In step 935, the backtrack cost may be determined. The backtrack cost may be found by multiplying the number of backtrack steps from step 935 times the cost of the backtrack steps. In one embodiment, the cost of a backtrack step may be determined globally. In another environment, the cost of a backtrack step may be determined by evaluating the time it took the backtrack step to be executed.

In step 940, the number of steps from the IPC after the common prefix to be replayed, until the IPC is complete, may be determined. In step 945, the replay cost may be determined. The replay cost may be found by multiplying the number of forward steps to be taken to complete the IPC times the cost of the replay steps. The cost of the replay steps may be determined similarly to those of the backtrack steps. In step 950, the replay-and-backtrack cost is thus the replay cost plus the backtrack cost.

In step 955, the replay-and-backtrack method of initialization and the complete replay method of initialization may be compared to determine which is cheaper. The initialization method with lower cost may be selected.

Returning to FIG. 4, scheduler node 104 may be configured to apply a scheduling policy for efficient parallelization of a software analysis problem in a distributed computing environment. The scheduling policy used by scheduler node 104 may include any appropriate scheduling policy for efficiently and intelligently assigning jobs to worker nodes 106.

The scheduling policy may include a policy of how to select a job from job queue 210. Any suitable policy for selecting a job from job queue 210 may be used. In one embodiment, job queue 210 may be configured as a first in, first out queue. The first pending job at the job queue 210 may be processed, representing the job that is the oldest in the queue. In another embodiment, job queue 210 may be implemented as a priority queue. In such a case, a job may be assigned a priority on factors such as those in the search policy. An example may be depth, wherein an unexplored branch at a lower depth may be given a higher priority, because there is a greater likelihood of developing a substantial search tree under the branches closer to the root of the graph. Any suitable method may be used to calculate priority of jobs within such a queue. For example, stored parameters from the creation of the job may be used to calculate an urgency. In such an embodiment, scheduler 104 may be configured to select the job with the highest calculated priority.

The scheduling policy may include a policy of how to select a worker node 106 from available resource list 212. Available resource list 212 may be configured as a list ordered by a time-stamp corresponding to when the entry was added to the list. Any suitable method for selecting a resource from available resource list 212. The type of method may depend upon the nature of the resources in the available resource list 212. Such resources may be heterogeneous or homogeneous in relation to each other in terms of computing power, memory, last computing state, etc.

In the case where the resources are largely homogeneous, a simple selection of resources may be used wherein the first resource added to the available resource list 212 may be selected for assignment. In the case where the resources are largely heterogeneous, a more sophisticated selection of a resource may be used wherein a best fit between a job and a resource may be determined. In such a case, criteria for matching a resource with a job may include, for example perceived size of the job compared to available computing power, perceived size of the job compared to available memory, or initialization cost. In one embodiment, the resource with the largest available computing power or memory may be selected. In another embodiment, the scheduler node 104 may determine the resource that best matches the job as to initialization cost by determining which resource in available resource list has a termination path condition which shares the longest common prefix with the job's initialization path condition. In yet another embodiment, ties may be broken based which resource has been waiting the longest in available resource list. Such a determination of waiting time may be based on a time stamp of the resource.

Scheduler node 104 may be configured to schedule the entries from job queue 210 and available resource list 212 at any suitable time. In one embodiment, scheduler node 104 may be configured to schedule the entries from job queue 210 and available resource list 212 periodically. In another embodiment, scheduler node 104 may be configured to schedule the entries from job queue 210 and available resource list 212 each time there is an addition into either structure.

Figure 10:
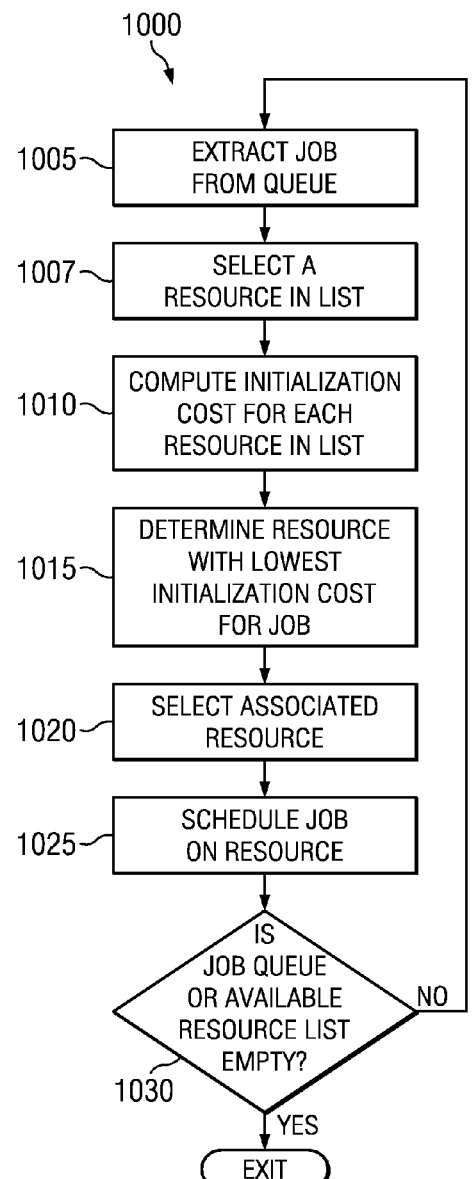
FIG. 10 is an example embodiment of a method for implementing a scheduling policy for efficient parallelization of a software analysis problem in a distributed computing environment.

FIG. 10 is an example embodiment of a method 1000 for implementing a scheduling policy for efficient parallelization of a software analysis problem in a distributed computing environment. In one embodiment, method 1000 may be implemented by scheduler node 104.

In step 1005, a job may be selected. The job may be selected from a job queue. In one embodiment, the job may be selected on a first-in, first-out basis. In another embodiment, the job may be selected by determining which is assigned the highest priority.

In step 1007, a resource may be selected from an available resource list. In one embodiment, a best match for the job may be found among the resources waiting in an available resource list. In another embodiment, a resource may be selected on a first-in, first-out basis. The criteria for a best match may include an initialization cost of the job on a given resource, or the amount of computing power or memory available on a given resource. Step 1007 may be implemented in steps 1010-1020.

In step 1010, the initialization cost for the job may be calculated for each resource in the available resource list, taking into account the last state executed in a previous job for each resource. Any suitable method of the calculation of initialization cost may be used. Such a last state executed, as stored in the resource, may lessen the cost of initialization, depending upon the job.

In step 1015, it may be determined which resource in the list has the lowest initialization cost for the extracted job. If another criteria is used for determining a best match, then a corollary determination may be made. In step 1020, the best-matched resource may be selected. If more than one resource was tied as the best match, the tie may be broken by selecting the resource with the oldest time-stamp.

In step 1025, the job may be scheduled for symbolic execution on the selected resource.

In step 1030, it may be determined whether either the job queue, representing pending jobs, or the available resource list, representing worker nodes to be assigned jobs, is empty. If either is empty, no scheduling may take place, and the method may terminate until another such resource arrives. However, if both jobs are pending and resources are waiting, then method 1000 may repeat until either such queue is empty.

Although FIGS. 5-7 and 9-10 disclose a particular number of steps to be taken with respect to example methods 500, 600, 700, 900, and 1000, methods 500, 600, 700, 900, and 1000 may be executed with more or fewer steps than those depicted in FIGS. 5-7 and 9-10. In addition, although FIGS. 5-7 and 9-10 disclose a certain order of steps to be taken with respect to methods 500, 600, 700, 900, and 1000, the steps comprising methods 500, 600, 700, 900, and 1000 may be completed in any suitable order. Some portions of FIGS. 5-7 and 9-10 may be successfully performed in the context of one or more of the other of FIGS. 5-7 and 9-10.

Methods 500, 600, 700, 900, and 1000 may be implemented using the system of FIGS. 1-6 and 8, or any other system, network, or device operable to implement methods 500, 600, 700, 900, and 1000. In certain embodiments, methods 500, 600, 700, 900, and 1000 may be implemented partially or fully in software embodied in computer-readable media. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure.

What is claimed is:

1. An electronic device, comprising:
   a memory;
   a processor coupled to the memory;
   one or more policies stored in the memory, including:
      a resource availability policy determining whether the processor should continue a previously initiated evaluation of software; and
      a job availability policy determining whether new jobs will be created for unexplored branches;
   wherein the job availability policy comprises a rule that new jobs are created from unexplored branches upon termination of the received job;
   wherein the processor is configured to:
      receive a job to be executed, the job comprising an indication of a portion of software to be evaluated;
      evaluate the software;
      if a branch in the software is encountered:
         select a branch to explore; and
         store an initialization sequence of one or more unexplored branches;
      evaluate the job availability policy;
      based on the job availability policy, decide whether to create a job for each of the unexplored branches;
      evaluate the resource availability policy; and
      based on the resource availability policy, decide whether to continue evaluating the software at the branch selected to explore.

2. The device of claim 1 wherein evaluating the software comprises symbolically executing code.

3. The device of claim 1 wherein the processor is further configured to replay an initialization sequence to reach a starting position within the code, the initialization sequence comprising one or more predicate decisions.

4. The device of claim 1 wherein the processor is further configured to:
   add indications of the new jobs to a job queue if new jobs are created as a result of evaluating the job availability policy.

5. The device of claim 1 wherein selecting a branch to explore comprises evaluating a search policy.

6. The device of claim 1 wherein the processor is further configured to:
   add to the new jobs one or more parameters learned from the partial execution of the job on the processor if new jobs are created as a result of evaluating the job availability policy.

7. The device of claim 1 where the processor is further configured to:
   based on the resource availability policy, end execution of the job.

8. The device of claim 7 where the processor is further configured to:
   store a final state, the final state indicating a sequence of steps taken in verifying the software before the job ended; and
   register with an available resource list, the available resource list indicating resources available to execute jobs.

9. The device of claim 1 wherein the processor is further configured to:
   based at least on the resource availability policy, determine whether the job is to be terminated;
   end execution of the job if the job is to be terminated.

10. The device of claim 9 wherein the processor is further configured to:
   store a final state, the final state indicating a sequence of steps taken in verifying the software before the job ended; and
   register with an available resource list, the available resource list indicating resources available to execute jobs.

11. The device of claim 1 wherein the job availability policy further comprises a rule that new jobs are created from unexplored branches when a job creation threshold is reached.

12. The device of claim 1 wherein the resource availability policy comprises a rule that execution of the received job is terminated when an execution threshold is reached.

13. The device of claim 1 wherein the processor is configured to receive an updated job availability policy or an updated resource availability policy during execution of the received job.

14. A computerized method for verifying software, comprising:
   receiving a job to be executed, the job comprising an indication of a portion of software to be evaluated;
   evaluating the software;
   if a branch in the software is encountered:
      selecting a branch to explore; and
      storing an initialization sequence of one or more unexplored branches;
   evaluating a job availability policy, the job availability policy determining whether new jobs will be created for unexplored branches;
   wherein the job availability policy comprises a rule that new jobs are created from unexplored branches upon termination of the received job;
   based on the job availability policy, deciding whether to create a job for each of the unexplored branches;
   evaluating a resource availability policy, the resource availability policy determining whether the processor should continue evaluating the software; and
   based on the resource availability policy, deciding whether to continue evaluating the software at the branch selected to explore.

15. The method of claim 14 wherein evaluating the software comprises symbolically executing code.

16. The method of claim 14 further comprising replaying an initialization sequence to reach a starting position within the code, the initialization sequence comprising one or more predicate decisions.

17. The method of claim 14 further comprising:
   adding indications of the new jobs to a job queue if new jobs are created as a result of evaluating the job availability policy.

18. The method of claim 14 wherein selecting a branch to explore comprises evaluating a search policy.

19. The method of claim 14 further comprising:
   adding to the new jobs one or more parameters learned from the partial execution of the job on the processor if new jobs are created as a result of evaluating the job availability policy.

20. The method of claim 14 further comprising:
   based on the resource availability policy, ending execution of the job.

21. The method of claim 20 further comprising:
   storing a final state, the final state indicating a sequence of steps taken in verifying the software before the job ended; and
   registering with an available resource list, the available resource list indicating resources available to execute jobs.

22. The method of claim 14 further comprising:
   based at least on the resource availability policy, determine whether the job is to be terminated;
   ending execution of the job if the job is to be terminated.

23. The method of claim 22 further comprising:
   storing a final state, the final state indicating a sequence of steps taken in verifying the software before the job ended; and
   registering with an available resource list, the available resource list indicating resources available to execute jobs.

24. The method of claim 14 wherein the job availability policy further comprises a rule that new jobs are created from unexplored branches when a job creation threshold is reached.

25. The method of claim 14 wherein the resource availability policy comprises a rule that execution of the received job is terminated when an execution threshold is reached.

26. The method of claim 14 wherein the job availability policy or the resource availability policy is updated during execution of the received job.

27. An article of manufacture comprising:
   a non-transitory computer readable medium; and
      computer-executable instructions carried on the computer readable medium, the instructions readable by a processor, the instructions, when read and executed, for causing the processor to:
         receive a job to be executed, the job comprising an indication of a portion of software to be evaluated;
         evaluate the software;
         if a branch in the software is encountered:
            select a branch to explore; and
            store an initialization sequence of one or more unexplored branches;
         evaluate a job availability policy, the job availability policy determining whether new jobs will be created for unexplored branches;
         wherein the job availability policy comprises a rule that new jobs are created from unexplored branches upon termination of the received job;
         based on the job availability policy, create a job for each of the unexplored branches;
         evaluate a resource availability policy, the resource availability policy determining whether the processor should continue evaluating the software; and
         based on the resource availability policy, decide whether to continue to evaluate the software at the branch selected to explore.

28. The article of claim 27 wherein evaluating the software comprises symbolically executing code.

29. The article of claim 27 further comprising causing the processor to replay an initialization sequence to reach a starting position within the code, the initialization sequence comprising one or more predicate decisions.

30. The article of claim 27 further comprising causing the processor to:
   causing the processor to add indications of the new jobs to a job queue if new jobs are created as a result of evaluating the job availability policy.

31. The article of claim 27 wherein selecting a branch to explore comprises evaluating a search policy.

32. The article of claim 27 further comprising causing the processor to:
add to the new jobs one or more parameters learned from the partial execution of the job on the processor if new jobs are created as a result of evaluating the job availability policy.

33. The article of claim 27 further comprising causing the processor to:
based on the resource availability policy, end execution of the job.

34. The article of claim 33 further comprising causing the processor to:
store a final state, the final state indicating a sequence of steps taken in verifying the software before the job ended; and
register with an available resource list, the available resource list indicating resources available to execute jobs.

35. The article of claim 27 further comprising causing the processor to:
based at least on the resource availability policy, determine whether the job is to be terminated;
end execution of the job if the job is to be terminated.

36. The article of claim 35 further comprising causing the processor to:
store a final state, the final state indicating a sequence of steps taken in verifying the software before the job ended; and
register with an available resource list, the available resource list indicating resources available to execute jobs.

37. The article of claim 27 wherein the job availability policy further comprises a rule that new jobs are created from unexplored branches when a job creation threshold is reached.

38. The article of claim 27 wherein the resource availability policy comprises a rule that execution of the received job is terminated when an execution threshold is reached.

39. The article of claim 27 wherein the job availability policy or the resource availability policy is updated during execution of the received job.

40. An electronic device, comprising:
a memory;
a processor coupled to the memory;
one or more policies stored in the memory, including:
a resource availability policy determining whether the processor should continue a previously initiated evaluation of software; and
a job availability policy determining whether new jobs will be created for unexplored branches;
wherein the job availability policy comprises a rule that new jobs are created from the one or more unexplored branches while the received job is being executed;
wherein the processor is configured to:
receive a job to be executed, the job comprising an indication of a portion of software to be evaluated;
evaluate the software;
if a branch in the software is encountered:
select a branch to explore; and
store an initialization sequence of one or more unexplored branches;
evaluate the job availability policy;
based on the job availability policy, decide whether to create a job for each of the unexplored branches;
evaluate the resource availability policy; and
based on the resource availability policy, decide whether to continue evaluating the software at the branch selected to explore.

41. A computerized method for verifying software, comprising:
receiving a job to be executed, the job comprising an indication of a portion of software to be evaluated;
evaluating the software;
if a branch in the software is encountered:
selecting a branch to explore; and
storing an initialization sequence of one or more unexplored branches;
evaluating a job availability policy, the job availability policy determining whether new jobs will be created for unexplored branches;
wherein the job availability policy comprises a rule that new jobs are created from the one or more unexplored branches while the received job is being executed;
based on the job availability policy, deciding whether to create a job for each of the unexplored branches;
evaluating a resource availability policy, the resource availability policy determining whether the processor should continue evaluating the software; and
based on the resource availability policy, deciding whether to continue evaluating the software at the branch selected to explore.

42. An article of manufacture comprising:
a non-transitory computer readable medium; and
computer-executable instructions carried on the computer readable medium, the instructions readable by a processor, the instructions, when read and executed, for causing the processor to:
receive a job to be executed, the job comprising an indication of a portion of software to be evaluated;
evaluate the software;
if a branch in the software is encountered:
select a branch to explore; and
store an initialization sequence of one or more unexplored branches;
evaluate a job availability policy, the job availability policy determining whether new jobs will be created for unexplored branches;
wherein the job availability policy comprises a rule that new jobs are created from the one or more unexplored branches while the received job is being executed;
based on the job availability policy, create a job for each of the unexplored branches;
evaluate a resource availability policy, the resource availability policy determining whether the processor should continue evaluating the software; and
based on the resource availability policy, decide whether to continue to evaluate the software at the branch selected to explore.

* * * * *